United States Patent [19]

Shakib et al.

[11] E Patent Number: Re. 31,747

[45] Reissued Date of Patent: Nov. 27, 1984

[54] PAPER FEED ROLLER ASSEMBLY FOR A TYPEWRITER OR PRINTER

[75] Inventors: Iraj D. Shakib; Krikor Yosmali, both of Lexington, Ky.

[73] Assignee: International Business Machines Corporation, Armonk, N.Y.

[21] Appl. No.: 499,742

[22] Filed: May 31, 1983

Related U.S. Patent Documents

Reissue of:

[64] Patent No.: 4,364,683
Issued: Dec. 21, 1982
Appl. No.: 333,958
Filed: Dec. 23, 1981

[51] Int. Cl.[2] ..... B41J 13/036; B41J 13/16

[52] U.S. Cl. ..... 400/637; 400/636.3; 400/637.6

[58] Field of Search ..... 400/636.3, 637, 637.2, 400/637.3, 637.4, 637.5, 637.6

[56] References Cited

U.S. PATENT DOCUMENTS

| | | | |
|---|---|---|---|
| 924,460 | 6/1909 | Hess | 400/637.2 X |
| 1,453,578 | 5/1923 | Armstrong | 400/636.3 X |
| 2,134,343 | 10/1938 | Salzberger | 400/637.2 X |
| 4,215,945 | 8/1980 | Habich et al. | 400/637.6 X |
| 4,221,489 | 9/1980 | Engle et al. | 400/637.6 X |

FOREIGN PATENT DOCUMENTS

| | | | |
|---|---|---|---|
| 612390 | 4/1935 | Fed. Rep. of Germany | 400/637.6 |

OTHER PUBLICATIONS

IBM Technical Disclosure Bulletin "Paper Feed Mechanism" Lloyd et al., vol. 23, No. 2, Jul. 1980, pp. 678–679.

*Primary Examiner*—Edgar S. Burr
*Assistant Examiner*—Charles A. Pearson
*Attorney, Agent, or Firm*—Laurence R. Letson

[57] ABSTRACT

A feed roll/paper deflector assembly for a printer or typewriter having a platen is described. The feed roll assembly is fabricated in such a way as to allow simple insertion into the printer or typewriter assembly and the retention of the feed roll assembly in a proper position within the typewriter by a hooking engagement with a paper release bail. Movement of the paper release bail will compress a spring allowing the paper deflector and feed rolls to be withdrawn from the periphery of the platen. The device allows automated assembly of the paper feed roll assembly into a machine and, in addition, provides complete self-alignment capability for the feed rolls with respect to the periphery of the platen.

3 Claims, 3 Drawing Figures

PAPER FEED ROLLER ASSEMBLY FOR A TYPEWRITER OR PRINTER

Matter enclosed in heavy brackets [ ] appears in the original patent but forms no part of this reissue specification; matter printed in italics indicates the additions made by reissue.

BACKGROUND OF THE INVENTION

Feed rolls in rolling engagement with the periphery of a printer platen for trapping and feeding sheets of paper are well known and have been used extensively in the typewriter and printer art.

Recent examples of such mechanisms involving feed rolls are U.S. Pat. No. 4,215,945 and U.S. Pat. No. 4,221,489.

U.S. Pat. No. 4,215,945 to Habich, et al, discloses a paper feed roll assembly carrying, on the deflector, feed rolls for engagement with the platen periphery.

The particular feed roll/paper deflector disclosed in U.S. Pat. No. 4,215,945 is particularly adapted to rocking of the paper deflector and the extending of paper alignment fingers through the paper deflector for automated paper insertion.

The paper deflector, once positioned on a supporting shaft, is selectively engageable through the feed rolls with the platen by rocking the paper deflector to engage either the front or the back feed rolls. However, the assembly is incapable of self-alignment with the platen inasmuch as it is constrained by the support shaft.

The paper deflector feed roll truck disclosed in U.S. Pat. No. 4,215,945 is readily assembled with the remainder of the typewriter but does not teach any self-alignment of the feed rolls with respect to the platen and, thus, would require rigid manufacturing and assembly quality control.

U.S. Pat. No. 4,221,489 to Engle, et al, is substantially completely self-aligning. The assembly of this device requires that the paper release bail be installed into the typewriter frame after the feed roll trucks have all been assembled in the remainder of the typewriter frame and supports.

The device disclosed in U.S. Pat. No. 4,221,489 provides the desirable self-alignment feature but is not a design which will permit ready assembly by automated assembly apparatus and is somewhat cumbersome for removal of the feed roll trucks for servicing.

ADVANTAGES OF THE INVENTION

The feed roll assembly disclosed herein has advantages over the devices disclosed in the prior art in that the yokes which confine and restrain the axles for the feed rolls are capable of deflecting and shifting within limited amounts to allow complete self-alignment of the feed rolls with the periphery of the platen. The yokes further act as a force transmission member to transmit the spring bias force of a pressure spring to the feed roll axles thereby forcibly engaging the feed rolls with the periphery of the platen.

The paper deflector provides a retaining appendage to trap and retain the pressure spring in the assembly when the assembly is first assembled and has not been inserted into the typewriter or printer.

Additionally, the paper deflector is provided with retaining appendages which act to hook onto and provide engaging surfaces for the paper release bail thereby allowing retraction of the feed rolls and the paper deflector from engagement and proximity to the platen for paper alignment.

The paper feed roll assembly is fabricated such that it may be assembled into the typewriter through automation or may be very easily and simply inserted and snapped into place manually as well as easily removed for repair and service without tools.

SUMMARY OF THE INVENTION

The paper feed roll assembly comprises a paper deflector with slots formed in the underside thereof to accept and constrain to only limited movement, yoke members which in turn capture and support the axles upon which feed rolls are mounted.

The yoke members are biased into the slots and against the underside of the paper deflector by a pressure spring formed generally from a flat piece of leaf spring stock. The pressure spring is trapped by an appendage of the paper deflector to retain the assembly in its assembled condition.

The paper deflector further comprises two retaining appendages which are hook-shaped and are engageable under the paper release bail which, when moved downward, will engage the hook-shaped members and pull them thus acting to pull the paper feed rolls away from the platen.

The yoke members provide a guide which fits over a mounting rail in the typewriter frame. The assembly of the paper feed mechanism into the typewriter is one of simply aligning the guides on the yoke member with the rail and compressing the pressure spring to permit the hook-shaped members to snap under and engage the paper feed bail. Upon the insertion of the platen into the typewriter, the platen will force the feed rolls downward allowing the hook-shaped members to disengage from the paper bail and deflect the pressure spring, thereby causing the force of the spring to be exerted through the feed rolls against the platen.

DRAWING

DETAILED DESCRIPTION OF THE INVENTION

Figure 1:
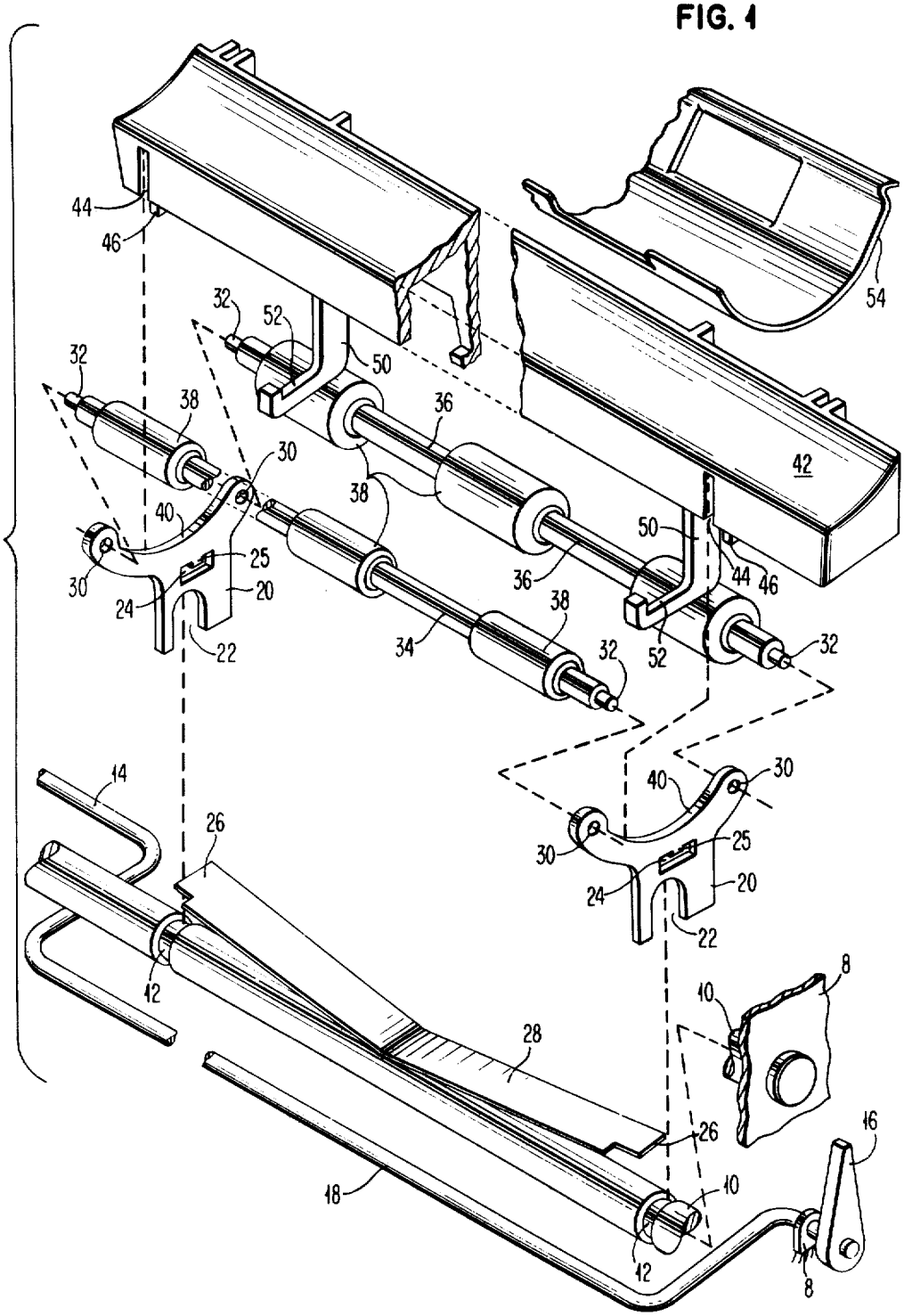
FIG. 1 is a perspective exploded view of the paper feed roll assembly together with the paper bail and support rail of the typewriter frame.
Figure 3:
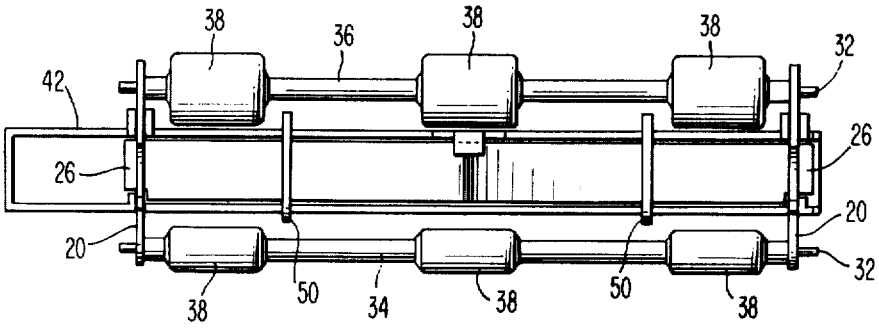
FIG. 3 is a bottom view of the feed roll assembly.
Figure 2:
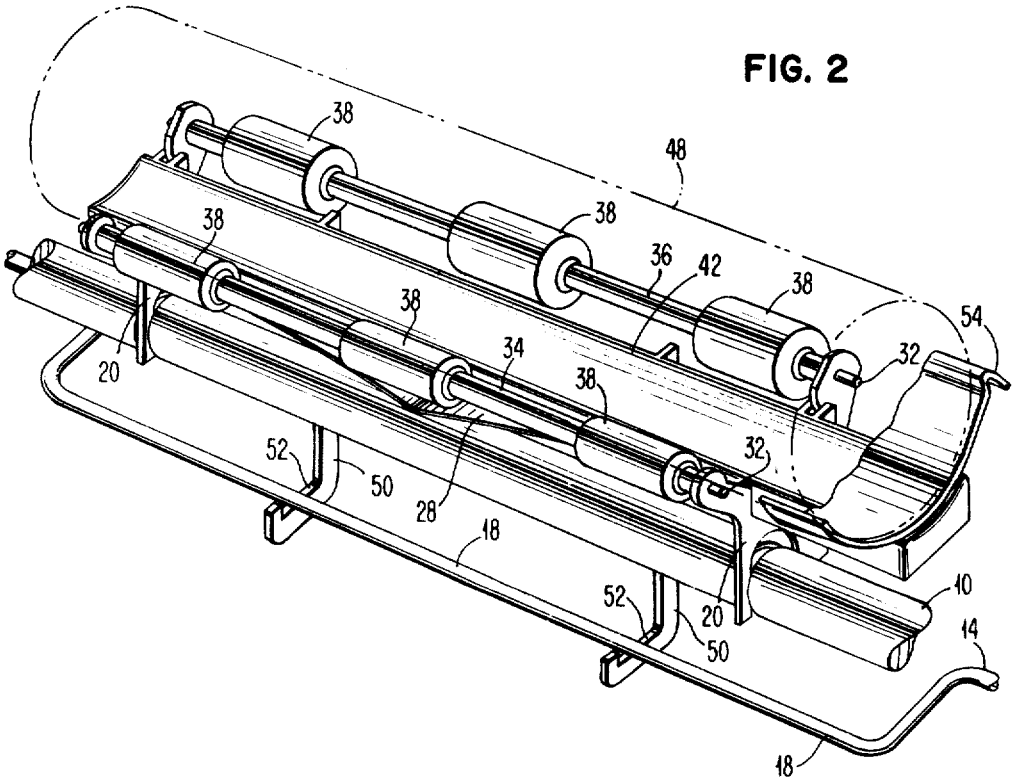
FIG. 2 illustrates the completely assembled device with the retaining hooks engaged with the paper release bail.

The feed roll assembly for incorporation into the typewriter 8 is illustrated in FIG. 1 in an exploded condition. The typewriter 8 includes a mounting shaft 10 having formed on the periphery thereof guide recesses 12. Guide recesses 12 are of a significant width to allow some axial shifting of the feed roll assembly relative to rail 10. Positioned in proximity to and below guide rail 10 is paper release bail 14 having attached thereto a control lever 16 schematically indicated as connected. The nature by which control lever 16 is connected to the bail 14 is immaterial with respect to the device described herein.

Paper release bail 14 includes an offset portion 18 which is positioned substantially below and parallel to rail 10. Paper release bail 14 is journaled in the side frames of the typewriter for rotary motion capable of moving offset section 18 generally downward under the influence of control level 16.

Yoke members 20 each possess a guide slot 22 formed in the bottom thereof for engagement with the recesses 12 on rail 10.

The yoke members 20 are constrained to limited axial shifting relative to rail 10.

Yoke 20 is further provided with apertures 24 which are in turn engaged normally with the end tab 26 of pressure spring 28. The apertures 24 have a protrusion 25 extending downward into the aperture. Protrusion 25 acts as a force/pivot point against end tab 26 to allow easy movement between yoke 20 and spring 28. Spring 28 is formed with a permanent set to provide a bias to yokes 20 when in the stressed position.

Yokes 20, through their holes 30, engage the ends 32 of front shaft 34 and rear shaft 36. Shafts 34 and 36 are respectively provided with feed rolls permanently mounted thereon and rotatable with shafts 34 and 36.

Yokes 20 are formed to provide a concave arcuate surface 40 on the top thereof. This surface 40 engages the arcuate under surface of the paper deflector support 42. Paper deflector support 42 is provided with a slot 44 formed in the underside thereof by projections extending outward from the paper deflector support 42. Paper deflector support 42 cradles and supports paper deflector 54.

Retaining hook 50 is formed as an appendage to the paper deflector support 42 with the hook member having an upper surface 52 which may be inserted below and engaged with the offset section 18 of paper release bail 14. Yoke members 20 will slide in slots 44 thus allowing relative movement along concave surfaces 40 of yokes 20. This allows the shifting of one yoke 20 with respect to the other and, more importantly, with respect to the platen 48 to allow self-alignment of the feed rolls 38 with the platen periphery. The hook members 50 and their upper hook surface 52 provide engagement with the paper release bail 14 and when the paper release bail 14 is rotated, the offset section 18 will pull downward on surface 52 and hook 50 to pull the paper deflector support 42 downward. Since the paper deflector support 42 is resting on concave surface 40 on yoke 20, as the paper deflector support 42 is pulled downward by the rotation of paper release bail 14, the spring 28 will be deflected in response to the additional force exerted on spring 28 by yoke 20.

The entire feed roll assembly may be assembled separately and inserted into the typewriter such that slots 22 engage recesses 12 on rail 10 and the paper deflector support 42 pressed downward until hook member 50 clears offset portion 18 of paper release bail 14. At that point, the paper deflector support 42 is rotated about rail 10 such that the hook member 50 swings in under the offset portion 18 and is allowed to move upward under the influence of spring 28 until surfaces 52 of hook members 50 engage the underside of offset portion 18 of paper release bail 14.

The paper feed roll assembly described has complete self-aligning characteristics to insure feed roll alignment with the platen, thereby assuring proper paper feed with no paper wrinkle or tearing.

The feed roll assembly design is very advantageous due to the ease of assembly with automated equipment involving only an insertion and rotation to assemble the assembly with the typewriter frame.

The invention is described with respect to one embodiment but one skilled in the art will recognize that changes may be made without departing from the spirit and intent of the description and still remain within the scope of the claims.

We claim:

1. A manually insertable and removeable paper feed roll device for a printer having a rotatable platen, a frame comprising a frame having sides and at least a rail extending therebetween and a release bail capable of operator movement away from said platen, comprising:
   - a paper deflector support;
   - a paper deflector;
   - a plurality of feed rolls, said feed rolls having a periphery extending through said paper deflector for engagement of said platen;
   - support means for maintaining said feed rolls in spaced relation to each other;
   - said paper deflector support supportable on said support means and moveable thereon;
   - said paper deflector support further comprising retraction and retention means for engaging said release bail to retract said paper deflector support upon movement of said release bail;
   - spring means engageable with said rail and biasingly engaged with said support means, whereby said device is manually insertable into said printer and retained therein by said retention means [engaging said release bail,] and said support means are biased to engage said feed rolls with said platen when said release bail is disengaged from said retraction [and retention] means.

2. The feed roll device of claim 1 wherein said spring means engages said support means with a tenon and mortise connection.

3. The feed roll device of claim 2 wherein said connection permits free movement permitting alignment of said rolls with said platen.

* * * * *